United States Patent
Ehler et al.

(10) Patent No.: US 6,935,443 B2
(45) Date of Patent: Aug. 30, 2005

(54) MINI DISK BIT

(75) Inventors: Alexander Ehler, Dresden (DE); Günter Kunze, Freital (DE); Volkmar Schrader, Schwarzheide (DE)

(73) Assignee: Man Takraf Foerdertechnik GmbH, Leipzig (DE)

( * ) Notice: Subject to any disclaimer, the term of this patent is extended or adjusted under 35 U.S.C. 154(b) by 70 days.

(21) Appl. No.: 10/306,700

(22) Filed: Nov. 27, 2002

(65) Prior Publication Data

US 2003/0098182 A1 May 29, 2003

(30) Foreign Application Priority Data

Nov. 29, 2001 (DE) .......................................... 101 58 603

(51) Int. Cl.$^7$ ......................... E21B 10/12; E21B 10/22
(52) U.S. Cl. ..................................... 175/373; 175/371
(58) Field of Search ................................ 175/351, 352, 175/371, 373, 374; 299/110, 111

(56) References Cited

U.S. PATENT DOCUMENTS

| | | | | |
|---|---|---|---|---|
| 3,216,513 A | * | 11/1965 | Robbins et al. | 175/227 |
| 3,847,235 A | * | 11/1974 | Goodfellow | 175/372 |
| 3,905,432 A | * | 9/1975 | Mullins | 175/335 |
| 4,040,493 A | * | 8/1977 | Saxman | 175/374 |
| 4,167,980 A | * | 9/1979 | Saxman | 175/374 |
| 4,784,438 A | * | 11/1988 | Fikse | 299/110 |
| 5,064,007 A | * | 11/1991 | Kaalstad | 175/334 |
| 5,234,064 A | * | 8/1993 | Lenaburg | 175/373 |
| 5,352,045 A | * | 10/1994 | Bennett et al. | 175/371 |
| 5,626,201 A | * | 5/1997 | Friant et al. | 175/365 |
| 5,904,211 A | * | 5/1999 | Friant et al. | 175/228 |
| 5,961,185 A | * | 10/1999 | Friant et al. | 299/33 |
| 6,131,676 A | * | 10/2000 | Friant et al. | 175/371 |

FOREIGN PATENT DOCUMENTS

DE      34 42 875      5/1986

OTHER PUBLICATIONS

G. Kunze and A. Ehler, Germany and B. Goericke, Russia, Apr./Jun. 2001, *Continuous Mining Process in Solid Rock*, Surface Mining Braunkohle & Other Minerals 53 (2001) No. 2 Apr./Jun.

W.M. Lizunkin, B.L. Goericke, J.B. Uzyr, 1999, *Mechanical Mining of Hard Ores Occurring in Layers of Small Thickness in Underground Mining*, Chita (Russia), 1999, p. 130.

* cited by examiner

Primary Examiner—David Bagnell
Assistant Examiner—Brian Halford
(74) *Attorney, Agent, or Firm*—McGlew and Tuttle, P.C.

(57) ABSTRACT

A small sized disk bit includes a bit holder accommodated in a bearing journal on its side (overhangingly), and a disk body with asymmetrically designed wedge flanks mounted rotatably thereon. To enable the disk body to absorb high radial and axial strong forces encountered during the engagement of the disk on a solid rock, the disk body is designed as a one-part disk body with a blind hole with its surface and the bearing journal surface being designed as components of the bearing. The bearing involves the combination of a radial and thrust bearing each, where the thrust bearing is milled into the track of the radial bearing. A ball bearing is used as the axial bearing and a needle roller bearing, a cylindrical roller bearing or a slide bearing is used as the radial bearing. The diameter of the ball bearing is larger than the diameter of the needle rollers, or the cylindrical rollers or the thickness of the sliding bush of the slide bearing.

18 Claims, 6 Drawing Sheets

MINI DISK BIT

FIELD OF THE INVENTION

The present invention pertains to a disk bit, which is also called roller bit, comprising a bit holder, a bearing journal accommodated on one side (in an overhanging manner) by the bit holder and a disk body mounted rotatably thereon with asymmetrically designed, wedge-shaped flanks. A disk bit of such a design with a disk body of a small diameter can be used in strip mining, drilling and road construction equipment as well as in roll type crushers.

BACKGROUND OF THE INVENTION

Due to the asymmetric design of the disk body as well as due to the forces resulting from the solution, its mounting on the bearing journal must be designed such that both radial and axial forces can be transmitted. These forces are relatively high because of the principle of action of disk bits during use in solid rocks. Since the forces to be applied decrease considerably with the reduction in the diameter of the disk bit, mining equipment that is equipped with disk bits having smaller, compact disk bodies can be used either in even harder rock or with a smaller amount of energy applied and with a more favorable wear behavior.

In mining machines such as surface miners with a mining mechanism rotatable around its horizontal axis, the material separated by the tools is delivered, in general, by threads from the outside to the inside toward the middle of the mining mechanism, where it is transferred onto a removing conveyor. The tools are arranged over the entire width of the mining mechanism in the lines of these threads at a certain distance from each other. The space between the jacket of the mining mechanism, the threads with the tools and the face (wall) is available as the transportation space for the separated material. If flat or round-shaft bits are used as the tools, they can be integrated within the threads because of their compact size. By contrast, the transverse conveying of the separated material would be substantially limited due to the bulky design in the case of equipping with conventional disk bits. To reach an economical mining output, the disk bit should have a free radial wedge height (the free radial wedge height corresponds to the dimension from the external hub diameter of the disk body to the cutting circle of the mining mechanism and is also called penetration capacity) of up to ¼ of the disk diameter with maximum rigidity. A disk bit intended for use in the mining mechanism of a surface miner must therefore be designed as a slender and robust mini disk bit.

Disk bits are successfully used in tunneling and in mining for removing or mining solid rocks. A crushing and at the same time splitting effect is achieved in the solid rock during the rolling of the disk bit on the solid rock with its wedge-shaped disk body. Strong pressing forces, which act on the tool as axial and radial forces, are necessary for this. The disk bits must consequently have a correspondingly robust design. This applies to both their dimensions and the shape, the selection of the material and the quenching and tempering as well as the mounting. While the design of these tools is solved in the case of disk bits in which the diameter of the disk body is 300 mm or greater, mounts of special designs must be provided in the case of smaller tools with asymmetric design of the disk body, because commercially available bearings are too large.

For example, a small disk bit with a disk body of asymmetrical cross section, in which the axis is supported on both sides at a fastening web and a slide bearing is provided between this axis and the disk body, is known from the article "Kontinuierlicher Gewinnungsvmechanismg im Festgestein" [Continuous Mining in Solid Rocks] published in the journal *Surface Mining—Braunkohle & Other Minerals*, Vol. 53 (2001), No. 2, pp. 185–190, FIG. 2, drawing on the right-hand side. The slide bearing comprises a bush, which is provided with front ring disks on both sides. The bush is split vertically in the center, so that a two-part slide bearing is formed. The radial forces are transmitted via the two halves of the bush to the fastening webs of the disk bit. Due to the splitting of the slide bearing, there is no clearance laterally in the area of the ring disks under radial load. The use of the slide bearing makes it possible to design the disk bit as a compact disk bit. However, two-sided support is associated with a great width. The sealing problems are not solved satisfactorily, either.

Even more slender designs can be obtained with an overhangingly arranged disk bit, as is known from the reference book "Mechanical Mining of Hard Ores Occurring in Layers of Small Thickness in Underground Mining" (original title: MEKHANIZI[R]OVANNAIA PODZEMNAIA RAZRABOTKA KREPKIKH RUD MALOMOSHCHNYKH MESTOROZHDENII), Chita (Russia), 1999, p. 130. This prior art is shown in FIG. 1. The bit holder B is fastened to the rotating tool holder A of a mining device. This bit holder B is provided with a conical hole C for accommodating the truncated cone-shaped bearing journal D. The bearing journal D has a cylindrical track E for a cylindrical roller bearing F, which assumes the task of a radial bearing. A ball groove G for a ball bearing H is milled into the circumference of the circle between the cylindrical track E and the truncated cone of the bearing journal D. This ball bearing H is a thrust bearing and a radial bearing at the same time. The disk body comprises three parts: The outer cutting ring I and the inner, two-part carrying and also ball bearing disk J and K. These three components are connected to one another by bolts L. The disk body is supported on the bearing journal D by means of a combined antifriction bearing, comprising a cylindrical roller bearing F and a ball bearing H. The inner track E for the cylindrical roller bearing F and the inner ball groove G for the ball bearing H are, as was described above, integrated in the overhanging part of the bearing journal D. The outer track M for the cylindrical roller bearing F and the outer ball groove N for the ball bearing H are located, by contrast, in the hole of the inner two-part carrying and also ball bearing disk J and K. The inner space of this combined antifriction bearing is closed to the outside by a cover O. To reduce the width of the bit, the disk body is supported according to this design only by a row of cylindrical rollers and an adjacent row of balls. This design of the disk bit and the bearing journal D offers the advantage that the diameter and the width of the disk body are relatively small.

Since the smallest possible width of the disk bit is desirable for the overhanging design, the width of the disk body is still considerable with two antifriction bearings F and H arranged next to each other. The manufacture of the multipart disk body I, J and K and of the entire disk bit also requires a great effort and causes high costs. At the same time, the multipart disk body guarantees a limited rigidity only. The rigidity of the bolted-together bit body also decreases with the reduction of its diameter.

Furthermore, a cutting or picking roller equipped with disk and round-shaft or flat bits for coal-mining equipment, in which the disk and round-shaft or flat bits are arranged one behind another in the direction of cutting in the threads, is known from DE 34 42 875 C2. In order to prevent the conveying of the separated material between the threads by the protruding disk bits with its holders from being compromised due to jamming, two annular side walls are additionally arranged in parallel to one another in the threads on the jacket of the picking roller and covered by a steel strip. The side walls and the steel strip are interrupted and thus they permit the disk bits to be accommodated on the jacket of the picking roller in the gaps of the threads. The disk bits integrated within the threads with their holders are thus protected and cannot hinder the material transport. The round-shaft or flat bits are fastened to the strip steel.

SUMMARY OF THE INVENTION

The basic object of the present invention is to develop a disk bit according to the preamble of the principal claim, which has, on the one hand, minimal overall dimensions with the advantages associated therewith in terms of small, compact disk bits and is therefore suitable for use in mining mechanisms of surface miners or also rollers of breaking units and, on the other hand, combines in itself the high stability, long service life and work output of disk bits of medium size (disk body diameters of 250 mm to 350 mm). The disk bit with its holder shall thus be so narrow that it does not hinder the transport of the separated material. The manufacturing effort and the manufacturing costs shall be low. With the small disk diameter and the short axis support, a penetration capacity of up to ¼ of the disk body diameter shall be able to be reached.

According to the invention, a disk bit is provided comprising a disk body with an outer cutting edge of wedge-shaped cross section and an axial hole. The axial hole is arranged freely rotatably and in an axially fixed manner on a bearing journal fastened overhangingly and detachably in a bit holder by means of a combined radial and thrust bearing. The bearing journal has the shape of a truncated cone on the fastening side. The bit holder has a conical hole in an equivalent manner to the bearing journal truncated cone shape. The bearing journal is connected by a fastening bolt to the bit holder. The circumference of the bearing journal is designed as the bearing inner part and the axial hole of the said disk body is designed as the bearing outer part of the combined radial and thrust bearing. The disk body has a one-part design and is provided with a blind hole. A needle roller bearing, a cylindrical roller bearing or a slide bearing is provided as the radial bearing and at least one ball bearing is provided as the axial bearing. The inner cylindrical track or sliding track on the bearing journal and the outer track or sliding track in the blind hole of the disk body for the bearing has a ball groove for the row of balls of a ball bearing. The diameters of the balls are larger than the diameter of the needle rollers or the cylindrical rollers or, in case of a design as a slide bearing, they are larger than the thickness of the sliding bush. The annular front sides of the disk body and of the bit holder pointing toward each other are designed as a seal. A closable filling hole for the balls leads to the ball track. This closable filling hole is provided in one of the wedge flanks of the disk body.

The disk body has a one-part design and has robust properties. It is both a tool and part of the combined axial and radial mounting. A ball groove, which is part of a ball bearing that assumes primarily the function of a thrust bearing, is integrated in the track of the radial bearing, which may be a cylindrical roller bearing, a needle bearing or a slide bearing. The balls have a larger diameter than the cylindrical rollers or needle rollers or the ball diameter is larger than the thickness of the sliding bush in order to guarantee a positive-locking connection by the balls for the purpose of the axial positioning of the disk body on the bearing journal. Since the ball diameter of the combined axial and thrust bearing is larger than the gap between the disk body and the bearing journal, a filling hole, which can be closed again after the equipping with balls, must be provided in one of the wedge flanks of the disk body for mounting the mini disk bit. Due to the encapsulated design of the mini disk bit (closed disk body, on the one hand, labyrinth seal, on the other hand), it is guaranteed that no foreign bodies can penetrate into the bearing. Permanent lubrication can be achieved, which guarantees maintenance-free operation. The mode of fastening of the bearing journal in the bit holder permits the problem-free replacement of the tools.

If the radial bearing is designed as a needle roller bearing or as a cylindrical roller bearing, the combined bearing may be alternatingly equipped with a certain number of needle rollers or cylindrical rollers and with a certain number of balls.

If the radial bearing is designed as a cylindrical roller bearing, two cylindrical rollers may be always arranged in pairs next to one another in a common axis and guided by a cage.

If the radial bearing is designed as a slide bearing, the sliding bush may be provided with holes and recesses in the area of the ball track or adjacent to the ball track.

The plane extending through the tip of the wedge of the disk body intersects the track or sliding track of the radial bearing in the center.

At least one additional ball bearing may be arranged in parallel to the first one.

A thickness of the bush of the slide bearing may be set equal to the diameter and the length of the needle rollers.

The annular front sides of the disk body and of the bit holder which face each other may be a labyrinth seal.

Further advantages of the subject of the present invention are explained on the basis of the following description and the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
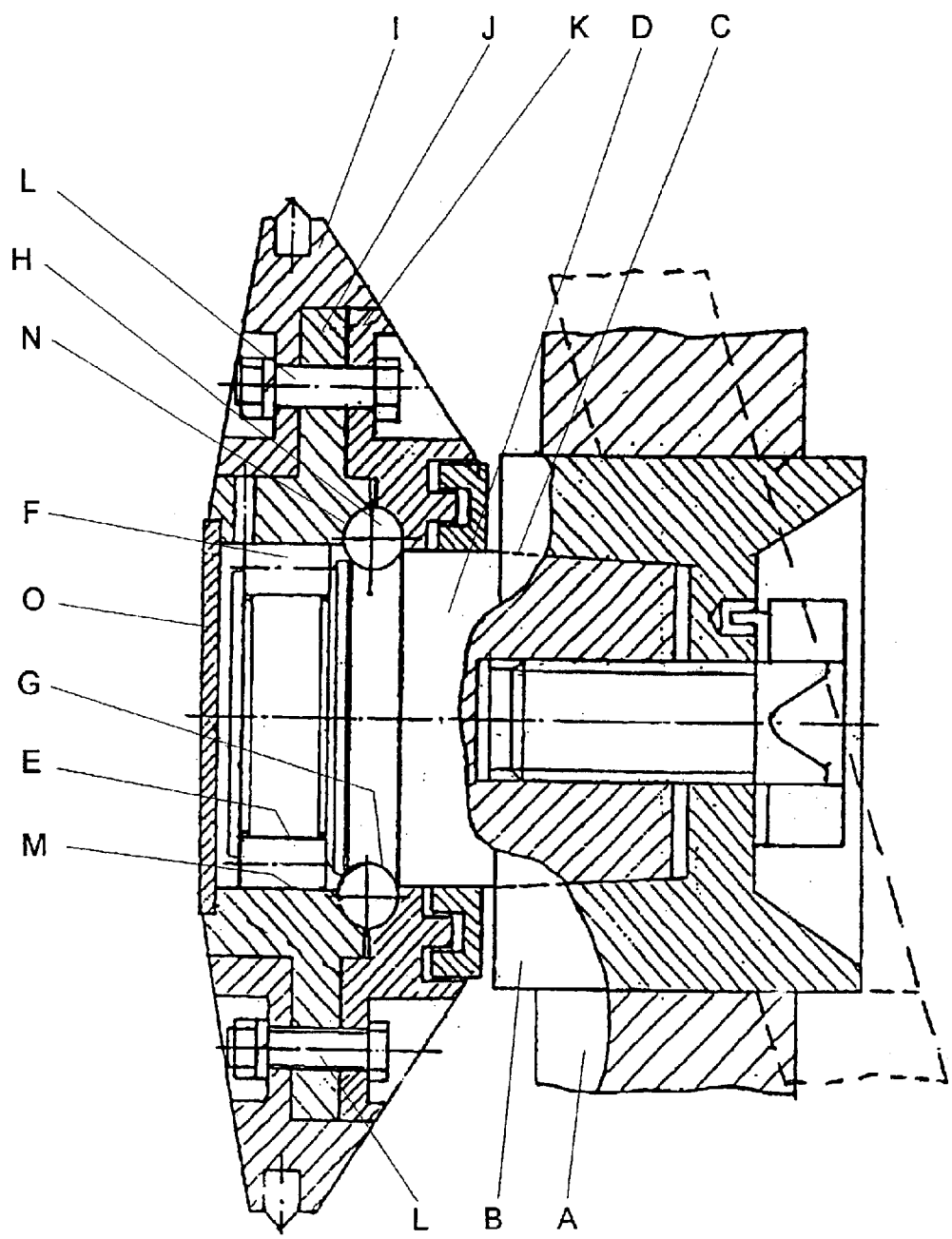
FIG. 1 is a sectional side view showing a prior art disk bit.
Figure 2:
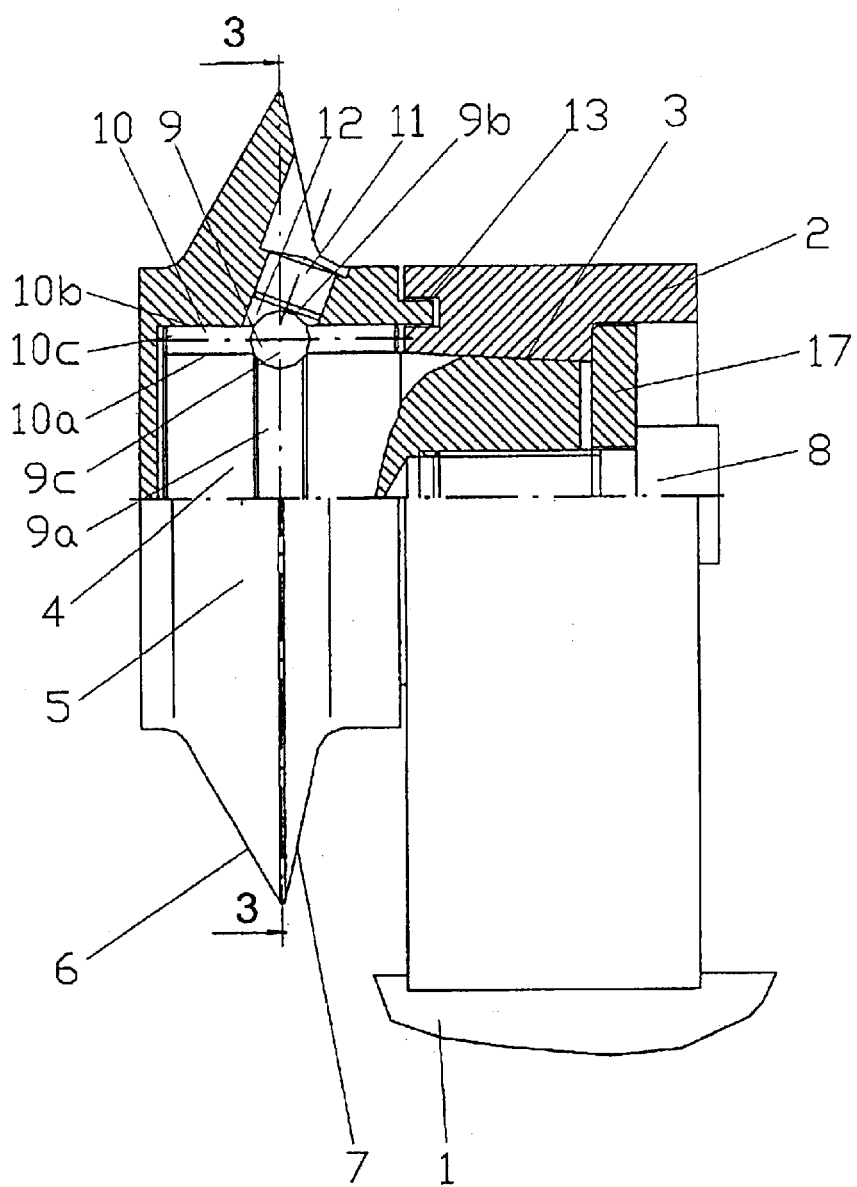
FIG. 2 is a partially sectional side view of a overhangingly arranged mini disk bit with a mount according to the invention, comprising the combination of a ball bearing with a needle roller bearing.

Referring to the drawings in particular, according to FIG. 2, bit holders 2 are arranged on a rotating, roller-shaped jacket 1 of a mining mechanism of a surface miner. Each bit holder 2 is provided with a horizontal conical hole 3 for accommodating the bearing journal 4. The one-part disk body 5 provided with a cutting edge on its circular circumference is mounted on the bearing journal 4. The bearing journal 4 is held in the bit holder 2 by the fastening bolt 8 via a washer 17.

The wedge flanks 6 and 7 of the disk body 5 are asymmetric. The material is selected and the actual sizes of the wedge flanks 6 and 7 are set according to the specific conditions of use and the conditions of the equipment as well as the separation properties and the particle sizes of the material to be mined.

To absorb the strong forces acting on the disk body 5 during the mining operation in the axial and radial directions, the bearings must have a robust design. Since no commercially available bearings can be used for mini disk bits because of the limited availability of space, a special design is provided. It comprises the antifriction bearing combination of a thrust bearing designed as a ball bearing 9 with a radial bearing designed as a needle roller bearing 10. The inner track 10a for the needle roller bearing 10 is located on the circumference of the overhanging part of the bearing journal 4, whereas the external track 10b is located in the disk body 5. The arrangement of the radial bearing is determined such that the plane extending through the tip of the edge of the disk body 5 (which corresponds to the cutting plane 3—3 of FIG. 2) intersects the track of this radial bearing exactly in the middle in order to achieve a uniform force distribution. The needle rollers 10c are located between the two tracks 10a and 10b. The inner ball groove 9a for the ball bearing 9 is milled in the middle of the track 10a of the needle roller bearing 10, whereas the outer ball grove 9b for the ball bearing 9 is located in the middle of the outer track 10b for the needle roller bearing 10.

Figure 3:
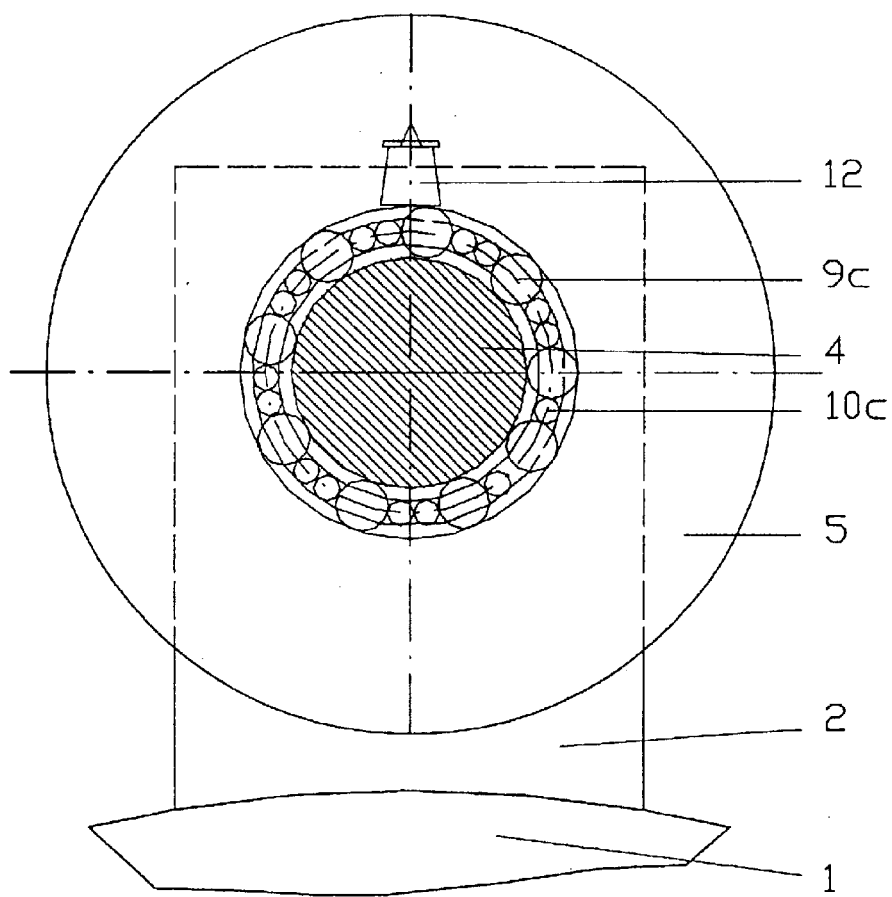
FIG. 3 is a sectional view taken along line 3—3 through the mini disk bit according to FIG. 2.

The equipping of the combined bearing with antifriction elements 9c and 10c is performed, as is shown in FIG. 3, where in the cycle one ball 9c and two needle rollers 10c are used. Other cycles adapted to the particular application may be provided as well. As an alternative, the radial bearing may also be designed as a cylindrical roller bearing. Due to the fact that the diameter-to-length ratios of the cylindrical rollers are different from those of the needle rollers 10c, the cylindrical rollers are arranged in pairs. To avoid jamming of the cylindrical rollers, the antifriction elements (balls 9c and cylindrical roller pairs) must be separated from one another and guided by means of cages.

While the needle rollers 10c can be mounted in the annular gap directly from the side without problems, a hole 12 that can be closed by means of a plug 11 or a bolt must be provided in the disk body 5 for the introduction of the balls 9c because of their larger diameter. The needle roller bearing 10 can absorb strong radial forces. All forces are transmitted by the ball bearing 9 predominantly in the axial direction. The axial positioning of the disk body 5 on the bearing journal 4 is guaranteed by a positive-locking connection with the larger ball diameter compared with the diameter of the needle rollers 10c or cylindrical rollers. An additional ball bearing 9 may also be provided in parallel to the first one if needed.

The bearing is sufficiently protected from contamination due to the design of the disk body 5, which is closed on one side, and has a labyrinth seal 13 on the other side.

Figure 4:
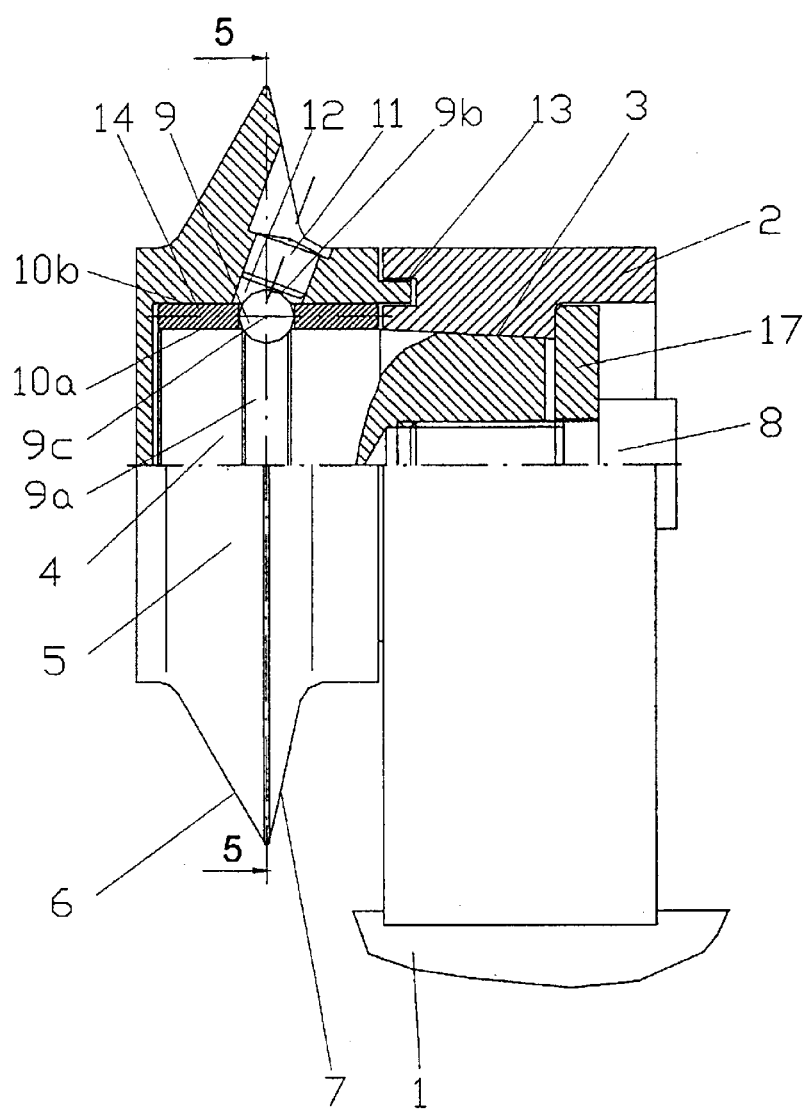
FIG. 4 is a partially sectional side view showing an overhangingly arranged mini disk bit with a mount according to the invention, comprising the combination of a ball bearing with a slide bearing.
Figure 5:
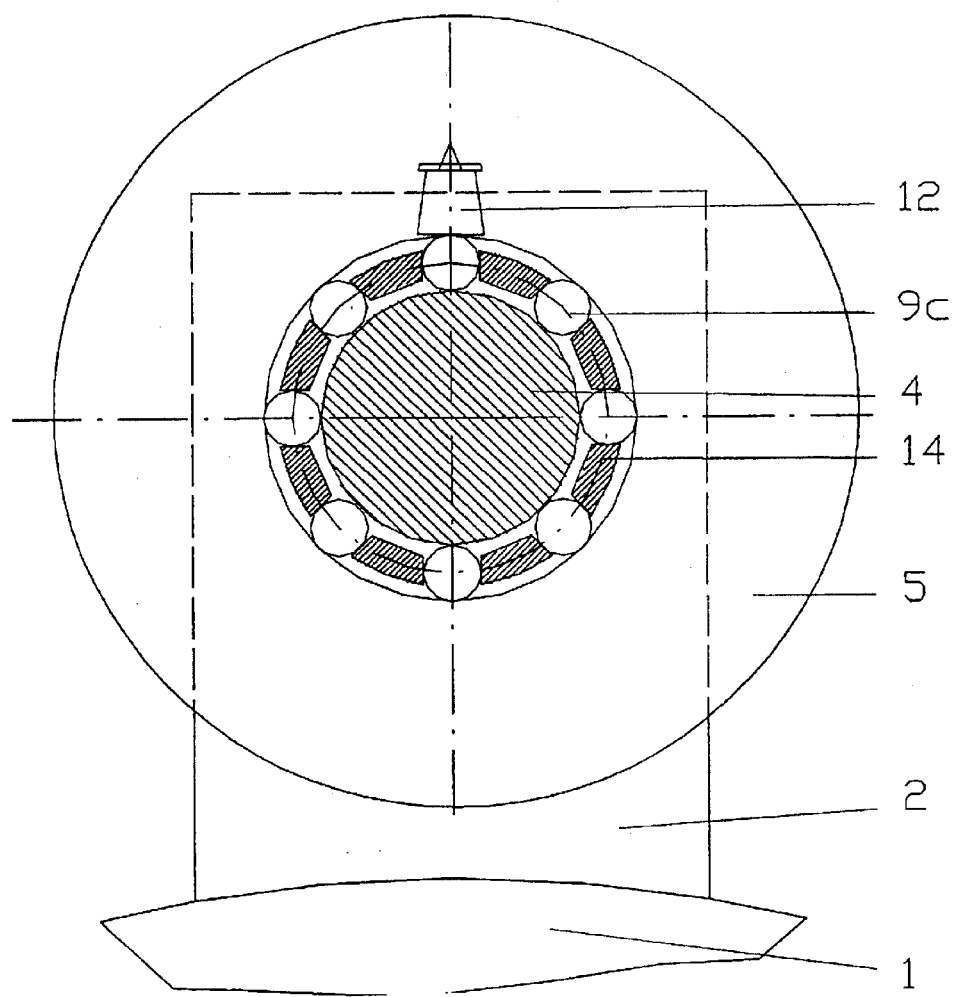
FIG. 5 is a sectional view taken along line 5—5 through the mini disk bit according to FIG. 4.
Figure 6:
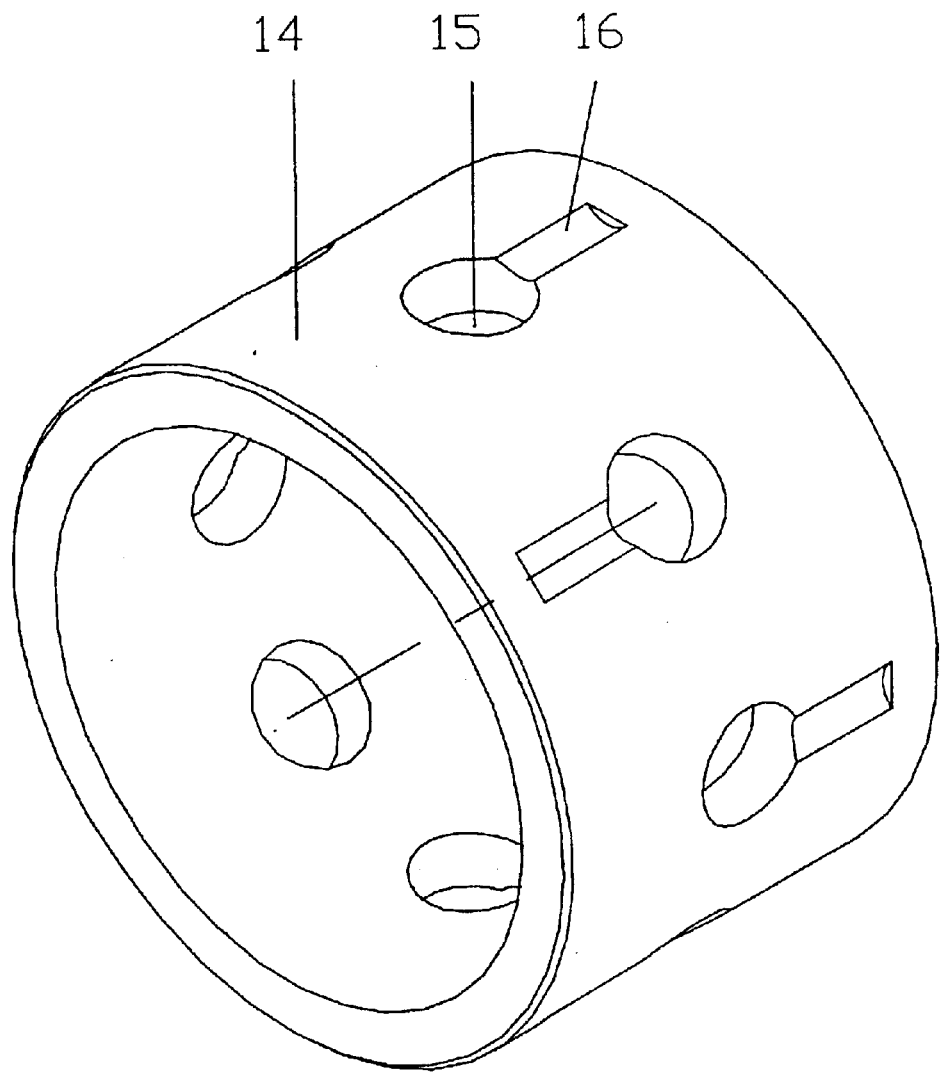
FIG. 6 is a perspective view of the sliding bush.

A second exemplary embodiment for a combined bearing is disclosed in FIGS. 4 and 5. Instead of the needle roller bearing 10 or a cylindrical roller bearing for the radially acting forces, a sliding bush 14 is provided in combination with the ball bearing 9. To receive the balls 9c, the sliding bush 14 is provided with holes 15 according to FIG. 6, which assume both the function of a cage and the function of a lubricant depot. The lubricant depot may be enlarged by mutually arranged recesses 16 if necessary.

While specific embodiments of the invention have been shown and described in detail to illustrate the application of the principles of the invention, it will be understood that the invention may be embodied otherwise without departing from such principles.

What is claimed is:

1. A disk bit arrangement comprising:
   a bit holder;
   a bearing journal, said bearing journal having a truncated cone shape on a fastening side and said bit holder having a conical hole complementary to said truncated cone shape, said bearing journal being fastened overhangingly and detachably in said bit holder by means of a fastening bolt, said bearing journal being connected by said fastening bolt to said bit holder;
   a combined radial and thrust bearing, wherein the bearings are in direct contact with one another;
   a disk body with an outer cutting edge of wedge-shaped cross section and an axial hole, said disk body axial hole being arranged freely rotatably and in an axially fixed manner on said bearing journal by means of said combined radial and thrust bearing, a circumference of said bearing journal forming a bearing inner part of said combined radial and thrust bearing, and said axial hole of said disk body forming a bearing outer part of said combined radial and thrust bearing, said disk body having a one-part design and being provided with said axial hole as a blind hole, the radial bearing component of said combined radial and thrust bearing being provided as one of a needle roller bearing, a cylindrical roller bearing and a slide bearing, and the thrust bearing component of said combined radial and thrust bearing mitigating axial forces and comprising at least one ball bearing ball, an inner cylindrical track or sliding track being defined on said bearing journal and an outer track or sliding track being defined in said blind hole of said disk body for said combined radial and thrust bearing with a ball groove forming a ball track for said at least one ball bearing ball, wherein a diameter of said at least one ball bearing ball is larger than a diameter of said needle rollers or said cylindrical rollers or larger than a thickness of a sliding bush of said slide bearing, and annular front sides of said disk body and of said bit holder pointing toward each other form a seal, and a closable filling hole is provided in one wedge flank of said disk body for said at least one ball bearing ball, said closable filling hole leading to said ball track.

2. A disk bit arrangement in accordance with claim 1, wherein said radial bearing is a needle roller bearing or a cylindrical roller bearing, and said combined radial and thrust bearing is alternatingly equipped with a certain number of needle rollers or cylindrical rollers and with a certain number of said ball bearing balls.

3. A disk bit arrangement in accordance with claim 1, wherein said radial bearing is a cylindrical roller bearing and two cylindrical rollers are always arranged in pairs next to one another in a common axis and are guided by a cage.

4. A disk bit arrangement in accordance with claim 1, wherein said radial bearing is a slide bearing and a sliding bush is provided with holes and recesses in an area of said ball track.

5. A disk bit arrangement in accordance with claim 1, wherein a plane extending through a tip of the wedge shaped section of the disk body intersects said track or sliding track of said radial bearing in a center of said track or sliding track.

6. A disk bit arrangement in accordance with claim 1, wherein at least one additional ball bearing ball is arranged in parallel to the first one.

7. A disk bit arrangement in accordance with claim 1, wherein a thickness of a bush of said slide bearing is equal to a diameter and a length of said needle rollers.

8. A disk bit arrangement in accordance with claim 1, wherein said seal on said annular front sides of said disk body and of said bit holder, which face each other, is a labyrinth seal.

9. A disk bit arrangement comprising:

a surface mining roller-shaped jacket rotating along a first axis;

a bit holder;

a bearing journal, said bearing journal having a truncated cone shape on a fastening side and said bit holder having a conical hole complementary to said truncated cone shape, said bearing journal being fastened overhangingly and detachably in said bit holder by means of a fastening bolt, said bearing journal being connected by said fastening bolt to said bit holder;

a combined radial and thrust bearing, wherein the bearings are in direct contact with one another;

a disk body with an outer cutting edge of wedge-shaped cross section and an axial hole, said disk body axial hole being arranged freely rotatably and in an axially fixed manner on said bearing journal by means of said combined radial and thrust bearing, a circumference of said bearing journal forming a bearing inner part of said combined radial and thrust bearing, and said axial hole of said disk body forming a bearing outer part of said combined radial and thrust bearing, said disk body having a one-part design and being provided with said axial hole as a blind hole, the thrust bearing component of said combined radial and thrust bearing mitigating axial and radial forces and comprising ball bearings, an inner track being defined on said bearing journal and an outer track being defined in said blind hole of said disk body for said combined radial and thrust bearing with a ball groove for a row of balls of said ball bearings, wherein a diameter of said balls is larger than a radial dimension of said radial bearing, and annular front sides of said disk body and of said bit holder pointing toward each other form a seal, and a closable filling hole is provided in one wedge flank of said disk body for said balls, said closable filling hole leading to said ball track.

10. A disk bit arrangement comprising:

a surface mining roller-shaped jacket rotating along a first axis;

a plurality of bit holders, each said bit holder having a conical hole and projecting out of said roller-shaped jacket at an axis perpendicular to said first axis;

a bearing journal with a central axis parallel to said first axis having a truncated cone shape complementary to said conical hole on a fastening side and having a bearing inner part around the circumference on the distal end, said bearing journal being fastened overhangingly and detachably in said bit holder by means of a fastening bolt;

an integral one piece disk body with an outer cutting edge of wedge-shaped cross section and an axial blind hole forming a bearing outer part, said disk body axial blind hole being arranged freely rotatably and in an axially fixed manner on said bearing journal by means of a combined radial and thrust bearing including a radial bearing component(s) adjacent to a thrust bearing component(s); and the combined radial bearing and thrust bearing means including said inner part and said outer part, wherein an annular side of said one-piece disk body and complementary side of said bit holder facing said annular side form a seal.

11. A disk bit arrangement according to claim 10, wherein said combined radial and thrust bearing means include ball bearings, an inner track being defined on said bearing journal and an outer track being defined in said axial blind hole with a ball groove for a row of balls with diameter larger than a radial dimension of said radial bearing means for said ball bearings, and a closable filling hole leading to said ball track is provided in one wedge flank of said one-piece disk body for said balls.

12. A disk bit arrangement according to claim 10, wherein said radial bearing means is at least one of a needle roller bearing and a cylindrical roller bearing, and said combined radial and thrust bearing is alternatingly equipped with a plurality of needle rollers or cylindrical rollers and with a plurality of ball bearing balls with diameter larger than a radial dimension of said radial bearing means for said ball bearings, and a closable filling hole leading to said ball track is provided in one wedge flank of said one-piece disk body for said balls.

13. A disk bit arrangement in accordance with claim 10, wherein said radial bearing means is a cylindrical roller bearing and two cylindrical rollers are always arranged in pairs next to one another in a common axis and are guided by a cage.

14. A disk bit arrangement in accordance with claim 10, wherein said radial bearing means is a slide bearing and a sliding bush is provided with holes and recesses in an area of said ball track.

15. A disk bit arrangement in accordance with claim 10, wherein a plane extending through a tip of the wedge shaped section of the disk body intersects said track or sliding track of said radial bearing in a center of said track or sliding track.

16. A disk bit arrangement in accordance with claim 10, wherein at least one additional ball bearing ball is arranged in parallel to the first one.

17. A disk bit arrangement in accordance with claim 10, wherein a thickness of a bush of said slide bearing is equal to a diameter and a length of said needle rollers.

18. A disk bit arrangement in accordance with claim 10, wherein said seal on said annular front sides of said disk body and of said bit holder, which face each other, is a labyrinth seal.

* * * * *